United States Patent [19]

Kusui

[11] Patent Number: 5,473,493
[45] Date of Patent: Dec. 5, 1995

[54] ROTARY MAGNETIC HEAD CLEANING MECHANISM WITH ROTATING ROLLER HAVING FLAPS

[75] Inventor: Yoshio Kusui, Kanagawa, Japan

[73] Assignee: Sony Corporation, Tokyo, Japan

[21] Appl. No.: 144,348

[22] Filed: Nov. 1, 1993

[30] Foreign Application Priority Data

Nov. 4, 1992 [JP] Japan .................................. 4-317966

[51] Int. Cl.$^6$ ........................................................ G11B 5/41
[52] U.S. Cl. ........................................................ 360/128
[58] Field of Search .......................... 360/128, 84, 85; 15/DIG. 12, 209.1, 210.1

[56] References Cited

U.S. PATENT DOCUMENTS

| | | | |
|---|---|---|---|
| 3,964,104 | 6/1976 | Herron et al. | 360/128 |
| 5,182,691 | 1/1993 | Mimasu et al. | 360/128 |

FOREIGN PATENT DOCUMENTS

| | | | |
|---|---|---|---|
| 56-58127 | 5/1981 | Japan | 360/128 |
| 57-34969 | 2/1982 | Japan | |
| 1-282716 | 11/1989 | Japan | 360/128 |
| 3-245313 | 10/1991 | Japan | 360/128 |
| 4-178911 | 6/1992 | Japan | 360/128 |
| 4-243011 | 8/1992 | Japan | 360/128 |

OTHER PUBLICATIONS

DE 4225722 A1, Kim, Su Kyung et al, German, Feb. 18, 1993.

Primary Examiner—Robert S. Tupper
Assistant Examiner—David L. Ometz
Attorney, Agent, or Firm—Jay H. Maioli

[57] ABSTRACT

A tape recording apparatus has a chassis, a rotary head rotatably mounted on the chassis to record a signal on or to reproduce a signal from a magnetic tape in a tape cassette, a reel base mounted on the chassis for supporting the tape cassette, a tape loading block movably mounted on the chassis for drawing the tape from the tape cassette and holding the tape against the rotary head, and a head cleaning mechanism including a rotatable cleaning roller mounted on the chassis for movement into and out of contact with the rotary head. The rotatable cleaning roller comprises a rotatable shaft and a plurality of flaps fixed radially to the rotatable shaft. Each of the flaps comprises a flexible lapping tape coated with an abrasive material. The head cleaning mechanism also has a swing arm assembly angularly movably mounted on the chassis for moving the cleaning roller into contact with the rotary head to clean the rotary head in response to operation of the tape loading block.

11 Claims, 6 Drawing Sheets

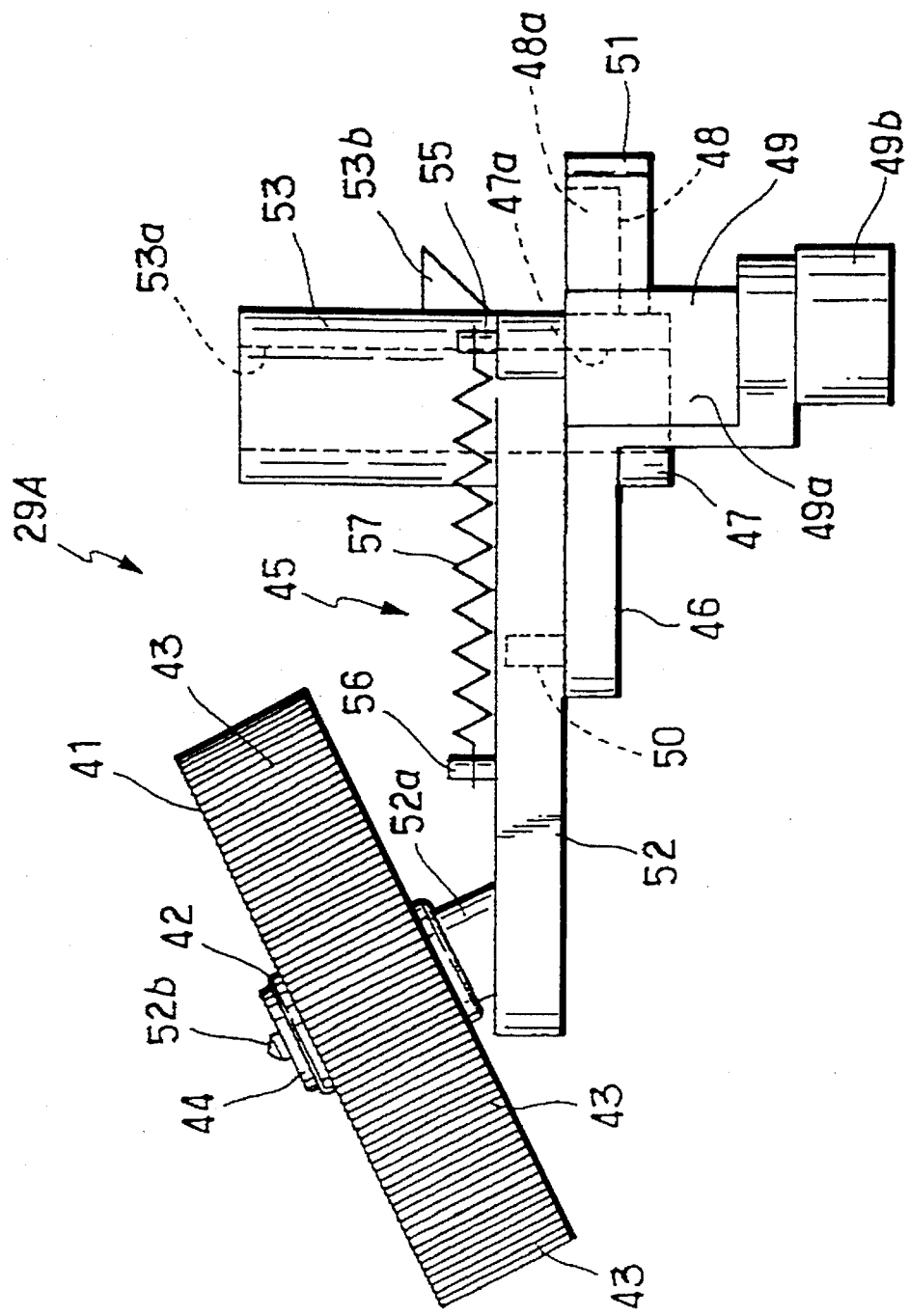

5,473,493

ROTARY MAGNETIC HEAD CLEANING MECHANISM WITH ROTATING ROLLER HAVING FLAPS

BACKGROUND OF THE INVENTION

1. Field of the Invention

The present invention relates to a mechanism for cleaning recording and reproducing heads mounted for movement along a circular path on a rotary drum in a recording and reproducing apparatus such as a video tape recorder, a digital audio tape recorder, or the like.

2. Description of the Prior Art

Video tape recorders and digital audio tape recorders with rotary heads have rotary head drum assemblies equipped with rotary magnetic recording and reproducing heads movable along an outer circumferential surface of the rotary head drum assembly.

The rotary head drum assembly comprises a stationary drum fixed to the chassis of the recorder and a rotatable drum rotatably supported on the stationary drum. The rotary magnetic recording and reproducing heads are supported on respective supports that are mounted on the rotatable drum. The magnetic heads are positioned relatively to the stationary and rotatable drums such that their respective tape contact surfaces for sliding contact with a magnetic tape are located between the stationary and rotatable drums at the outer circumferential surface of the rotary head drum assembly.

The magnetic tape is wrapped around the outer circumferential surface of the rotary head drum assembly through a given wrapping angle. Desired signals are recorded on and reproduced from the magnetic tape by the magnetic heads which scan the recording surface of the magnetic tape while the magnetic tape is being transported and the rotatable drum is being rotated.

The signals are recorded on and reproduced from the magnetic tape at a very high density, and the magnetic heads have very small head gaps or clearances. If dust particles such as of the magnetic powder of the magnetic tape are attached to the tape contact surfaces of the magnetic heads or enter the head gaps thereof, then the signals may not be recorded on and reproduced from the magnetic tape.

To avoid such a difficulty, some video tape recorders and digital audio tape recorders have a head cleaning mechanism for cleaning the tape contact surfaces of rotary magnetic recording and reproducing heads.

One conventional head cleaning mechanism comprises a rotatable cleaning roller movable into and out of contact with the outer circumferential surface of a rotary head drum assembly, the rotatable cleaning roller being made of an elastically deformable material. When the rotatable cleaning roller is brought into contact with the rotary head drum assembly, it cleans the tape contact surfaces of the magnetic heads and also a certain area of the outer circumferential surface of the rotary head drum assembly, which area has a certain vertical width including the circular path along which the magnetic heads are rotatable.

FIG. 1 of the accompanying drawings shows such a conventional head cleaning mechanism a.

As shown in FIG. 1, a rotary head drum assembly b comprises a stationary drum c and a rotatable drum d rotatably positioned coaxially adjacent to the stationary drum c. A plurality of magnetic heads e are supported on the rotatable drum d and positioned in a small gap f defined axially between the stationary and rotatable drums c, d. The magnetic heads e are placed in respective recesses h that are defined in a lower surface of a circumferential wall g of the rotatable drum d at circumferentially spaced intervals. The magnetic heads e have respective tape contact surfaces i slightly projecting outwardly from an outer circumferential surface j of the rotary head drum assembly b.

The head cleaning mechanism comprises a vertical roller support shaft k supported on a movable member (not shown) and a cleaning roller 1 of polyurethane or the like which is rotatably supported on the upper end of the roller support shaft k. The cleaning roller 1 is horizontally aligned with an area m of the outer circumferential surface j of the rotary head drum assembly b, the area m having a certain vertical width including the circular path along which the magnetic heads e are rotatable. The cleaning roller 1 is movable by the movable member between a standby position, indicated by the solid lines, spaced from the head drum assembly b and a contact position, indicated by the two-dot-and-dash lines, held in contact with the head drum assembly b. When in the contact position, the cleaning roller 1 is resiliently held against the outer circumferential surface j of the rotary head drum assembly b.

To clean the magnetic heads e, the rotatable drum d with the magnetic heads e is rotated, and then the cleaning roller 1 is brought into the contact position. When the cleaning roller 1 contacts the outer circumferential surface j of the rotary head drum assembly b, the peripheral speed of the cleaning roller 1 initially differs from the peripheral speed of the rotary head drum assembly b. Therefore, the cleaning roller 1 rubs against an outer circumferential surface n of the rotatable drum d and the tape contact surfaces i of the magnetic heads e, thereby cleaning a portion of the outer circumferential surface n and the tape contact surfaces i.

The cleaning roller 1 can thus prevent magnetic powder particles of the magnetic tape and other dust particles from being attached to the outer circumferential surface n and the tape contact surfaces i. However, the cleaning roller 1 fails to remove deposited magnetic powder particles and other dust particles that have clogged head gaps or clearances around the tape contact surfaces i of the magnetic heads e. Heretofore, removal of such clogging dust particles has required a dedicated cleaning tape cassette to be used with the rotary head assembly a.

OBJECTS AND SUMMARY OF THE INVENTION

It is an object of the present invention to provide a head cleaning mechanism for cleaning a rotary magnetic head mounted on a rotary head assembly to remove dust particles from a tape contact surface thereof and a gap or clearance around the tape contact surface.

According to the present invention, there is provided a mechanism for cleaning a rotary head which is movable along a circular path to record a signal on or reproduce a signal from a recording medium, comprising a rotatable cleaning roller movable into and out of contact with the rotary head, the rotatable cleaning roller comprising a rotatable shaft and a plurality of flaps fixed radially to the rotatable shaft.

According to the present invention, there is also provided an assembly comprising a rotary head movable along a circular path to record a signal on or reproduce a signal from a recording medium, and a rotatable cleaning roller movable into and out of contact with the rotary head, the rotatable cleaning roller comprising a rotatable shaft and a plurality of flaps fixed radially to the rotatable shaft.

According to the present invention, there is further provided an assembly comprising a chassis, a rotary head mounted on the chassis for movement along a circular path to record a signal on or reproduce a signal from a tape in a tape cassette, a reel base mounted on the chassis for supporting the tape cassette, a tape loading member movably mounted on the chassis for drawing the tape from the tape cassette and holding the tape against the rotary head, and a rotatable cleaning roller mounted on the chassis for movement into and out of contact with the rotary head, the rotatable cleaning roller comprising a rotatable shaft and a plurality of flaps fixed radially to the rotatable shaft.

According to the present invention, there is also provided a mechanism for cleaning a rotary head which is rotatable along a circular path to record a signal on or to reproduce a signal from a recording medium, comprising a mount base, and a rotatable cleaning roller mounted on the mount base for movement into contact with the rotary head, the cleaning roller being rotatable of its own accord upon contact with the rotary head, the cleaning roller comprising a rotatable shaft and a plurality of flaps fixed radially to the rotatable shaft.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 7 is an enlarged side elevational view of the head cleaning mechanism shown in FIG. 6.

DETAILED DESCRIPTION OF THE PREFERRED EMBODIMENTS

FIGS. 2 through 5 show a head cleaning mechanism according to the present invention which is incorporated in an 8-mm video tape recorder for cleaning rotary magnetic recording and reproducing heads thereof.

Figure 1:
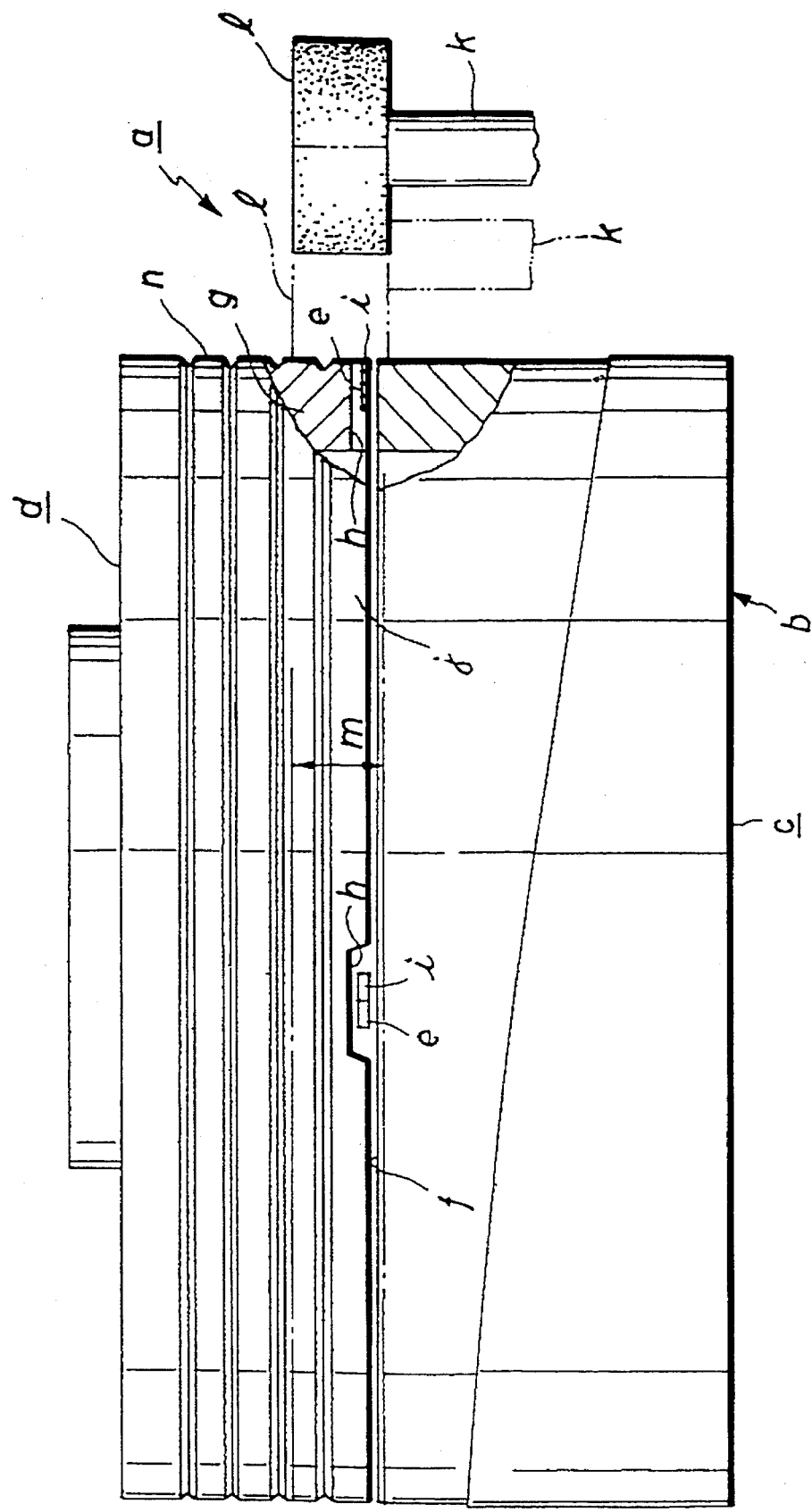
FIG. 1 is a side elevational view, partly broken away, of a rotary head assembly associated with a conventional head cleaning mechanism.
Figure 2:
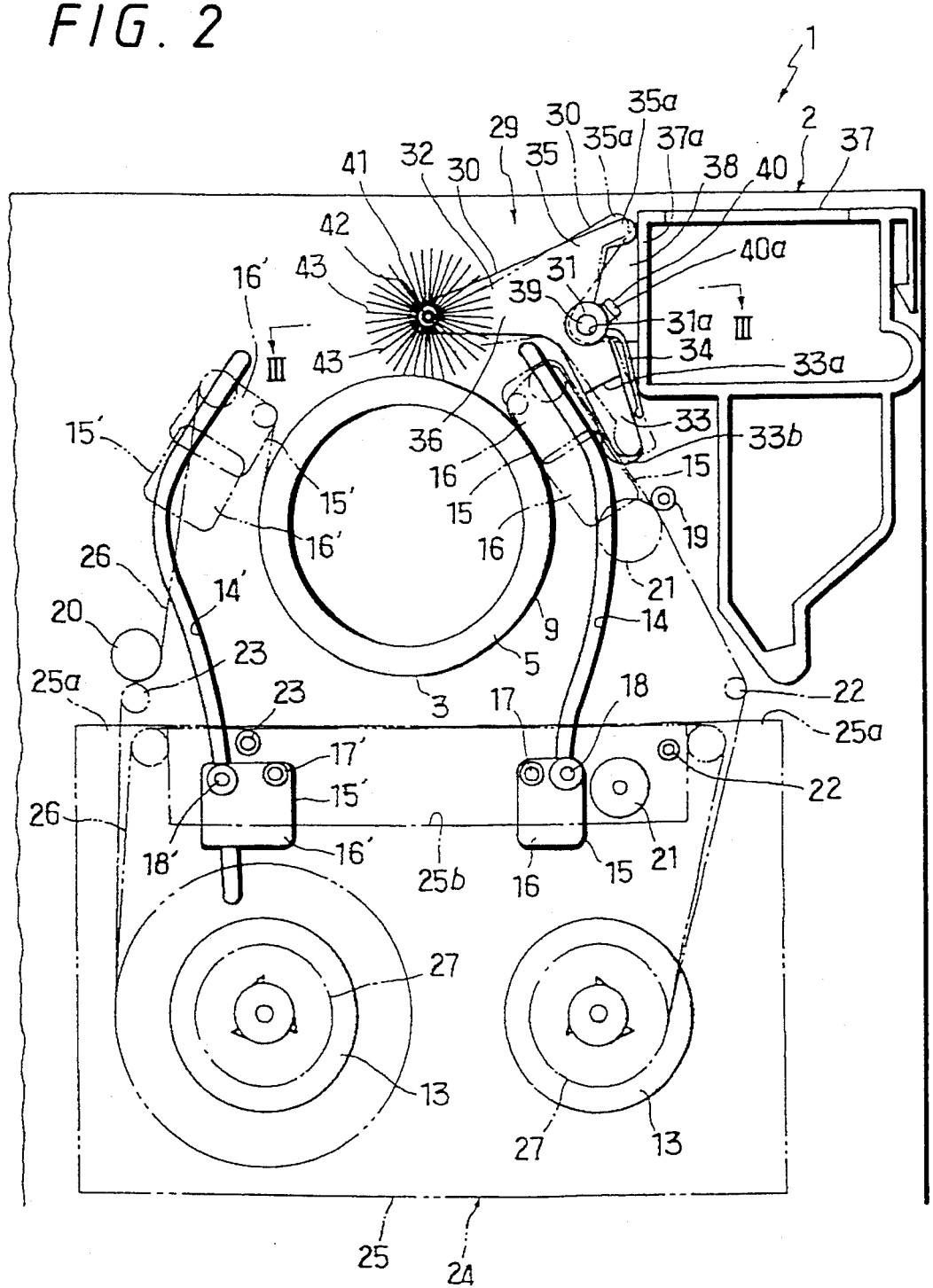
FIG. 2 is a fragmentary plan view of an 8-mm video tape recorder incorporating a head cleaning mechanism according to the present invention.
Figure 3:
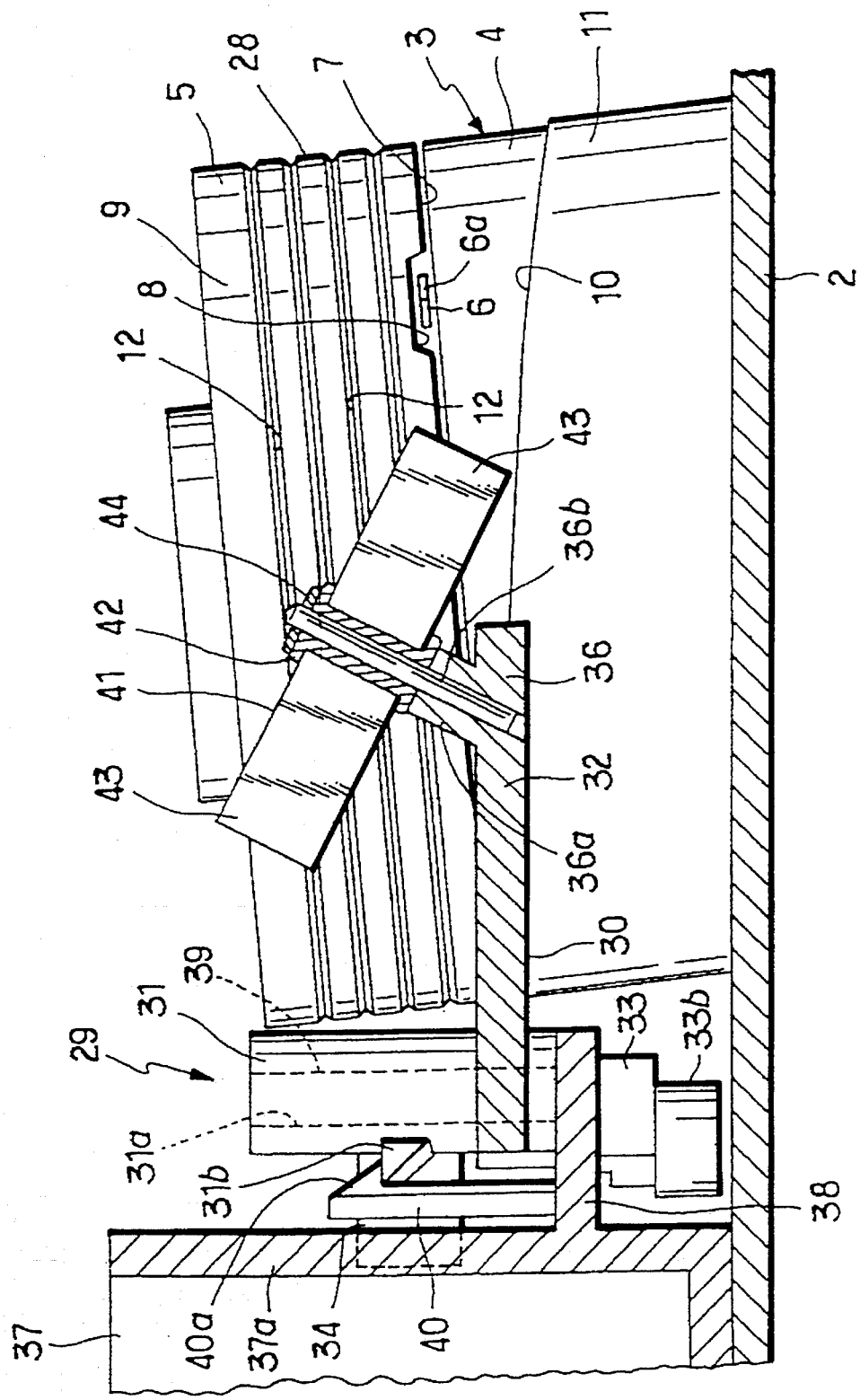
FIG. 3 is a cross-sectional view taken along line III—III of FIG. 2.

FIGS. 2 and 3 illustrates some principal mechanical components of a recording and reproducing assembly of the 8-mm video tape recorder, generally designated by the reference numeral 1.

As shown in FIGS. 2 and 3, the 8-mm video tape recorder 1 includes a chassis 2 which supports a rotary head drum assembly 3 mounted thereon that projects upwardly from a rear end portion of the chassis 2. As shown in FIG. 3, the rotary head drum assembly 3 comprises a stationary drum 4 fixedly mounted on the chassis 2, a rotatable drum 5 disposed coaxially with and rotatably supported on the stationary drum 4, and a plurality of rotary magnetic recording and reproducing heads 6 supported on a head board (not shown) that is supported on the rotatable drum 5. The magnetic heads 6 are positioned at spaced intervals in the circumferential direction of the rotary head drum assembly 3.

The stationary and rotatable drums 4, 5 are axially spaced from each other by a small gap or clearance 7. The rotatable drum 5 has a plurality of circumferentially spaced recesses 8 defined in a lower end of a circumferential wall of the rotatable drum 5. The magnetic heads 6 are positioned in the respective recesses 8. The magnetic heads 6 have respective tape contact surfaces 6a slightly projecting outwardly from an outer circumferential surface 9 of the rotatable drum 5.

The stationary drum 4 has a helical tape guide step 10 defined on an outer circumferential surface 11 of the stationary drum 4. The helical lead surface 10 faces upwardly and is inclined progressively downwardly toward the chassis 2 in a counterclockwise direction as viewed from above the rotary head drum assembly 3.

The rotatable drum 5 has a plurality of parallel circumferential grooves 12 defined in the outer circumferential surface 9 of the rotatable drum 5. The grooves 12 serve to generate an air film on the outer circumferential surface 9 of the rotatable drum 5. The grooves 12 are spaced at equal intervals along the axis of the rotatable drum 4, and each have a substantially V-shaped cross section.

The axis of the rotary head drum assembly 3 is shown as extending perpendicularly to the chassis 2 in FIG. 2, but is actually inclined slightly to the right in FIG. 2, i.e., to the left in FIG. 3.

For recording signals on or reproducing signals from a magnetic tape 26 with the magnetic heads 6, the rotatable drum 5 is rotated about its own axis by a drum motor (not shown) thereby rotating the magnetic heads 6 along a circular path on and around the rotary head drum assembly 3.

As shown in FIG. 2, the chassis 2 supports thereon a pair of spaced reel bases 13 projecting upwardly from a front end portion of the chassis 2. The chassis 2 has a pair of guide grooves 14, 14' defined therein which have respective substantial portions extending substantially arcuately around the rotary head drum assembly 3. The guide grooves 14, 14' have respective front ends positioned behind the respective reel bases 13 and respective rear ends positioned laterally behind the rotary head drum assembly 3. The spacing between the guide grooves 14, 14' becomes progressively greater in the rearward direction toward the rotary head drum assembly 3 and then progressively smaller beyond the rotary head drum assembly 3.

The 8-mm video tape recorder has a pair of tape loading blocks 15, 15' comprising respective movable bases 16, 16' movable along the respective guide grooves 14, 14', and respective pairs of loading posts 17, 18 and 17', 18' mounted upwardly on the respective movable bases 16, 16'. Before starting to load the magnetic tape 26, tape loading blocks 15, 15' are held in an initial position indicated by the solid lines, i.e., at the respective front ends of the guide grooves 14, 14'. When the magnetic tape 26 starts being loaded, the tape loading blocks 15, 15' move from the initial position along the guide grooves 14, 14' toward a loaded position indicated by the dot-and-dash lines, i.e., at the respective rear ends of the guide grooves 14, 14'.

A capstan 19 is rotatably supported on the chassis 2 on the right-hand side (as viewed in FIG. 2) of the rotary head drum assembly 3. A tape guide 20, a pinch roller 21, a swing tape guide 22, and a tension regulating pin 23 are supported on the tip ends of respective swing arms that are angularly movably supported on the chassis 2. The tape guide 20, the pinch roller 21, the swing tape guide 22, and the tension regulating pin 23 are held in an initial position indicated by the solid lines in FIG. 2 before the magnetic tape 26 is loaded.

A tape cassette 24 which can be inserted into the 8-mm video tape recorder 1 has a cassette case 25 housing a pair of rotatable tape reels 27 and the magnetic tape 26 is wound around the tape reels 27 and has opposite ends secured thereto. The length of the magnetic tape 26 which extends between the tape reels 27 is led out of the cassette case 25 from laterally spaced tape outlet holes 25a defined in the cassette case 25, and extends across a tape withdrawal cavity 25b defined in a front portion of the cassette case 25.

When the tape cassette 24 is inserted into the 8-mm video tape recorder 1, the tape reels 27 are engaged by the respective reel bases 13. Immediately after the tape cassette 24 is inserted into the 8-mm video tape recorder 1, i.e., before the magnetic tape 26 starts being loaded around the rotary head drum assembly 3, the loading posts 17, 18 and 17', 18', the pinch roller 21, the swing tape guide 22, and the tension regulating pin 23 are positioned within the tape withdrawal cavity 25b defined in the cassette case 25.

When the magnetic tape 26 starts being loaded around the rotary head drum assembly 3, the tape loading blocks 15, 15' move toward the loaded position at the rear ends of the guide grooves 14, 14' and the pinch roller 21, the swing tape guide 22, and the tension regulating pin 23 move toward the respective positions indicated by the dot-and-dash lines in FIG. 2. A certain length of the magnetic tape 26 is now drawn out of the cassette case 25 by the tape loading blocks 15, 15'. When the magnetic tape 26 is fully loaded, a portion of the drawn length of the magnetic tape 26 is wrapped helically around an outer circumferential surface 28 of the rotary head drum assembly 3. The magnetic tape 26 is vertically retained in position on the rotary head drum assembly 3 by the tape guide step 10 which is lightly contacted by a lower edge of the magnetic tape 26 wrapped around the rotary head drum assembly 3.

After the magnetic tape 26 is thus loaded, desired signals can be recorded on and reproduced from the magnetic tape 26 by the magnetic heads 6 while the rotatable drum 5 is being rotated and the magnetic tape 26 is being transported from one of the tape reels 13 to the other tape reel 13.

The head cleaning mechanism, generally designated by the reference numeral 29, for cleaning the magnetic heads 6 essentially comprises a swing arm assembly 30 angularly movably supported on the chassis 2 and a cleaning roller 41 rotatably supported on the swing arm assembly 30.

The swing arm assembly 30 has a vertical central cylindrical pivot 31 rotatably fitted over a vertical support shaft 39 joined to a motor bracket 37, a roller support arm 32 integrally formed with the cylindrical pivot 31 and extending radially outwardly therefrom, and a pressable arm 33 integrally formed with the cylindrical pivot 31 and extending radially outwardly therefrom at about 90° with respect to the roller support arm 32. A resilient finger 34 projects radially outwardly from the cylindrical pivot 31 substantially parallel to the pressable arm 33.

As shown in FIG. 2, the roller support arm 32, which is of a substantially triangular shape as viewed from above, has three vertexes one of which is joined to the cylindrical pivot 31. Another of the vertexes serves as a roller support end 36 on which the cleaning roller 41 is rotatably supported, and the remaining vertex serves as a stopper 35.

The pressable arm 33 has a step 33a in its longitudinally intermediate portion and includes a downwardly displaced portion extending radially outwardly from the step 33a. A substantially semicylindrical pressable member 33b integrally projects further downwardly from the radially outer end of the downwardly displaced portion. When the swing arm assembly 30 is mounted on the chassis 2 in a manner described later on, the pressable member 33b is positioned at substantially the same height as the movable base 16 of the tape loading block 15 that is positioned on the right-hand side of the rotary head drum assembly 3 as viewed in FIG. 2. The stopper 35 has an integral stopper abutment 35a projecting to the right as viewed in FIG. 2. A shaft support sleeve 36a is integrally formed with and extends obliquely upwardly from the roller support end 36 in a direction crossing the axis of the rotary head drum assembly 3. A cleaning roller support shaft 36b has its lower portion fitted in the shaft support sleeve 36a.

The motor bracket 37 for supporting a motor (not shown) is fixedly mounted on the upper surface of the chassis 2 at a position slightly spaced rightward and rearward from the rear end of the right-hand guide groove 14. The motor bracket 37 includes a laterally elongate hollow rectangular rear portion including a left-hand vertical side wall 37a, from which there extends an arm support wing 38 to the left as viewed in FIG. 2. As shown in FIG. 3, the arm support wing 38 is spaced upwardly from the upper surface of the chassis 2. The vertical support shaft 39 is vertically mounted on the distal end of the arm support wing 38. The vertical support shaft 39 is inserted through a vertical hole 31a defined in the cylindrical pivot 31 such that the swing arm assembly 30 is angularly movably supported on the arm support wing 38.

With the swing arm assembly 30 angularly movably supported on the arm support wing 38, the resilient finger 34 is resiliently held against the side wall 37a of the bracket 37 for normally urging the swing arm assembly 30 to turn clockwise in FIG. 2 holding the stopper abutment 35a against the side wall 37a.

The cylindrical pivot 31 has an engaging tooth 31b projecting radially outwardly from an outer circumferential surface thereof at a position higher than the swing arm assembly 30. A resilient engaging lever 40 projects upwardly from the arm support wing 38 adjacent to the vertical support shaft 39, the resilient engaging lever 40 having an engaging tooth 40a on its upper end. When the cylindrical pivot 31 is fully fitted over the vertical support shaft 39, the engaging tooth 40a of the resilient engaging lever 40 resiliently snaps into locking engagement with the engaging tooth 31b of the cylindrical pivot 31, thereby holding the swing arm assembly 30 against accidental removal from the vertical support shaft 39.

Figure 4:
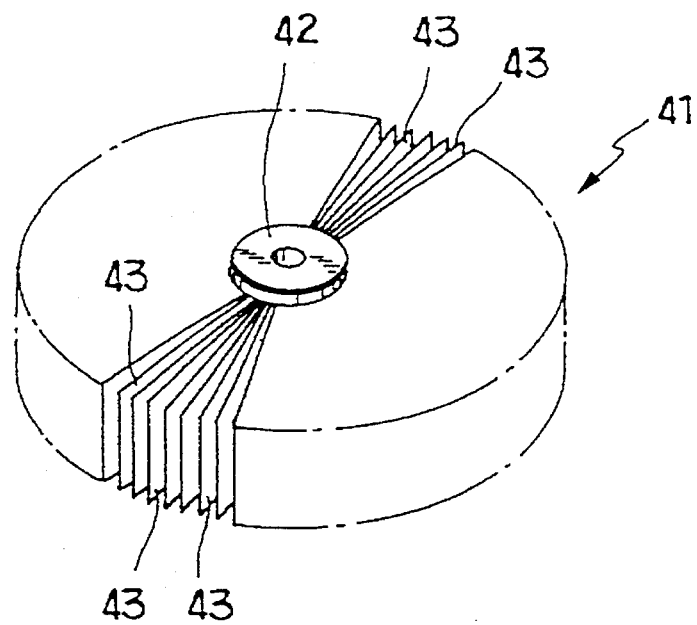
FIG. 4 is an enlarged perspective view of a cleaning roller of the head cleaning mechanism according to the present invention.
Figure 5:
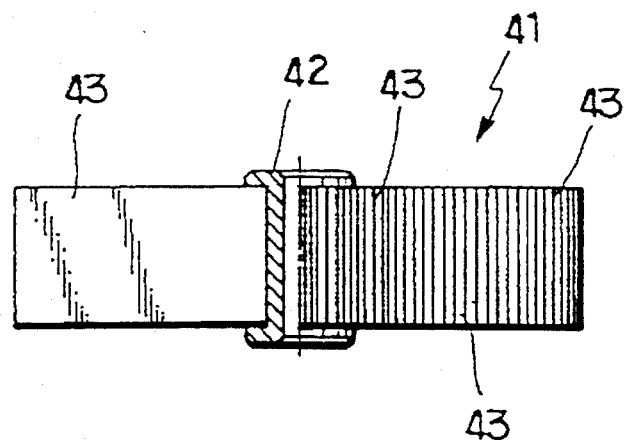
FIG. 5 is an enlarged side elevational view, partly cut away, of the cleaning roller shown in FIG. 4.

As shown in FIGS. 4 and 5, the cleaning roller 41 comprises a plurality of (e.g., 40) elongate rectangular flexible flaps or lapping tapes 43 coated with an abrasive material which are radially joined on one end to an outer circumferential surface of a sleeve 42. In this embodiment, each of the elongate rectangular flaps 43 has a width of about 4.5 mm and a length of 8 mm.

The cleaning roller 41 is rotatably supported on the cleaning roller support shaft 36b which has its upper portion, above the shaft support sleeve 36a, inserted in the sleeve 42. The cleaning roller 41 is retained against removal from the cleaning roller support shaft 36b by a retaining washer 44 that is secured to the upper end of the cleaning roller support shaft 36b.

The cleaning roller 41 is positioned vertically with respect to the rotary head drum assembly 3 such that the vertical extent of the cleaning roller 41 covers an area of the outer circumferential surface 28 of the rotary head drum assembly 3 which has a certain vertical width across the circular path of the magnetic heads 6.

Operation of the head cleaning mechanism 29 will be described below.

The swing arm 30 is controlled in its angular movement as follows:

While the magnetic tape 26 is being loaded, i.e., while the magnetic tape 26 is being drawn from the cassette case 25 until it is wrapped around the rotary head drum assembly 3, the swing arm 30 is held in a standby position in which the cleaning roller 41 is spaced from the rotary head drum assembly 3 except when the movable base 16 of the right-hand tape loading block 15 moves through a certain position.

More specifically, before the magnetic tape 26 starts being loaded, the stopper abutment 35a of the stopper 35 is held against the side wall 37a under the bias of the resilient finger 34, keeping the cleaning roller 41 spaced from the rotary head drum assembly 3.

When the magnetic tape 26 starts being loaded, the tape loading blocks 15, 15' start moving rearwards along the respective guide grooves 14, 14'. Upon arrival of the tape loading block 15 at a position indicated by the two-dot-and-dash lines in FIG. 2, which is slightly short of the loaded position indicated by the dot-and-dash lines, the movable base 16 thereof engages and pushes the pressable member 33b rearwards to the right. Therefore, the swing arm 30 is angularly moved counterclockwise against the bias of the resilient finger 34, moving the flaps 43 of the cleaning roller 41 into a position in which they can engage the tape contact surfaces 6a of the respective magnetic heads 6 on the outer circumferential surface 28 of the rotary head drum assembly 3.

Continued movement of the movable base 16 toward the loaded position releases itself from engagement with the pressable member 33b, whereupon the swing arm 30 is turned clockwise back to the standby position under the bias of the resilient finger 34. The cleaning roller 41 is now spaced again from the outer circumferential surface 28 of the rotary head drum assembly 3.

When the loaded magnetic tape 26 starts to be unloaded, i.e., wound back into the cassette case 25, the tape loading blocks 15, 15' move along the respective guide grooves 14, 14' to their initial position. Upon this movement, the movable base 16 of the tape loading block 15 also engages and pushes the pressable member 33b rearwards to the right. The swing arm 30 is angularly moved counterclockwise against the bias of the resilient finger 34, moving the flaps 43 of the cleaning roller 41 into the position for engagement with the tape contact surfaces 6a of the respective magnetic heads 6.

As the movable base 16 is continuously moved toward the unloaded position, it is released from engagement with the pressable member 33b, turning the swing arm 30 clockwise back to the standby position under the bias of the resilient finger 34. The cleaning roller 41 is now spaced again from the outer circumferential surface 28 of the rotary head drum assembly 3.

The tape contact surfaces 6a of the respective magnetic heads 6 are cleaned by the cleaning roller 41 as follows:

Immediately or shortly before the movable base 16 engages the pressable member 33b when the magnetic tape 26 is both loaded and unloaded, the rotatable drum 5 is controlled to start rotating temporarily thereby rotating the magnetic heads 6 along the circular path. Therefore, when the movable base 16 engages and pushes the pressable member 33b, the cleaning roller 41 contacts the magnetic heads 6, particularly their tape contact surfaces 6a, while the magnetic heads 6 are rotating along the circular path. Therefore, the tape contact surfaces 6a and also gaps or clearances around the magnetic heads 6 within the recesses 8 are cleaned by the cleaning roller 41.

More specifically, when the cleaning roller 41 that is not rotating about its own axis is brought into contact with the tape contact surfaces 6a of the magnetic heads 6 that are rotating along the circular path, the cleaning roller 41 is rotated by contact with the tape contact surfaces 6a. Therefore, the flaps 43 of the cleaning roller 41 successively rub against the tape contact surfaces 6a as the flaps 43 are flexed, thus scraping dust particles such as magnetic powder particles off the tape contact surfaces 6a and regions around the tape contact surfaces 6a. The flaps 43 are also effective to prevent gaps or clearances around the magnetic heads 6 from being clogged by dust particles, and also to remove clogging dust particles or material which may have been deposited in the gaps or clearances around the magnetic heads 6 when, for example, a magnetic tape damaged by moisture, heat, or dust has been transported around the outer circumferential surface 28 of the rotary head drum assembly 3. Consequently, no dedicated cleaning tape cassette is required to be used on the rotary head drum assembly 3.

As described above, the shaft support sleeve 36a extends obliquely upwardly from the roller support end 36 across the axis of the rotary head drum assembly 3. This arrangement allows the flaps 43 of the cleaning roller 41 to sweep the outer circumferential surface 9 of the rotatable drum 5 and the tape contact surfaces 6a in a direction which is oblique to the direction in which the outer circumferential surface 9 and the tape contact surfaces 6a rotate. Therefore, the corners of the radially outer end of each of the flaps 43 can easily enter gaps 7 (see FIG. 3) between the magnetic heads 6 and the stationary drum 4 for thereby effectively cleaning the magnetic heads 6.

Figure 6:
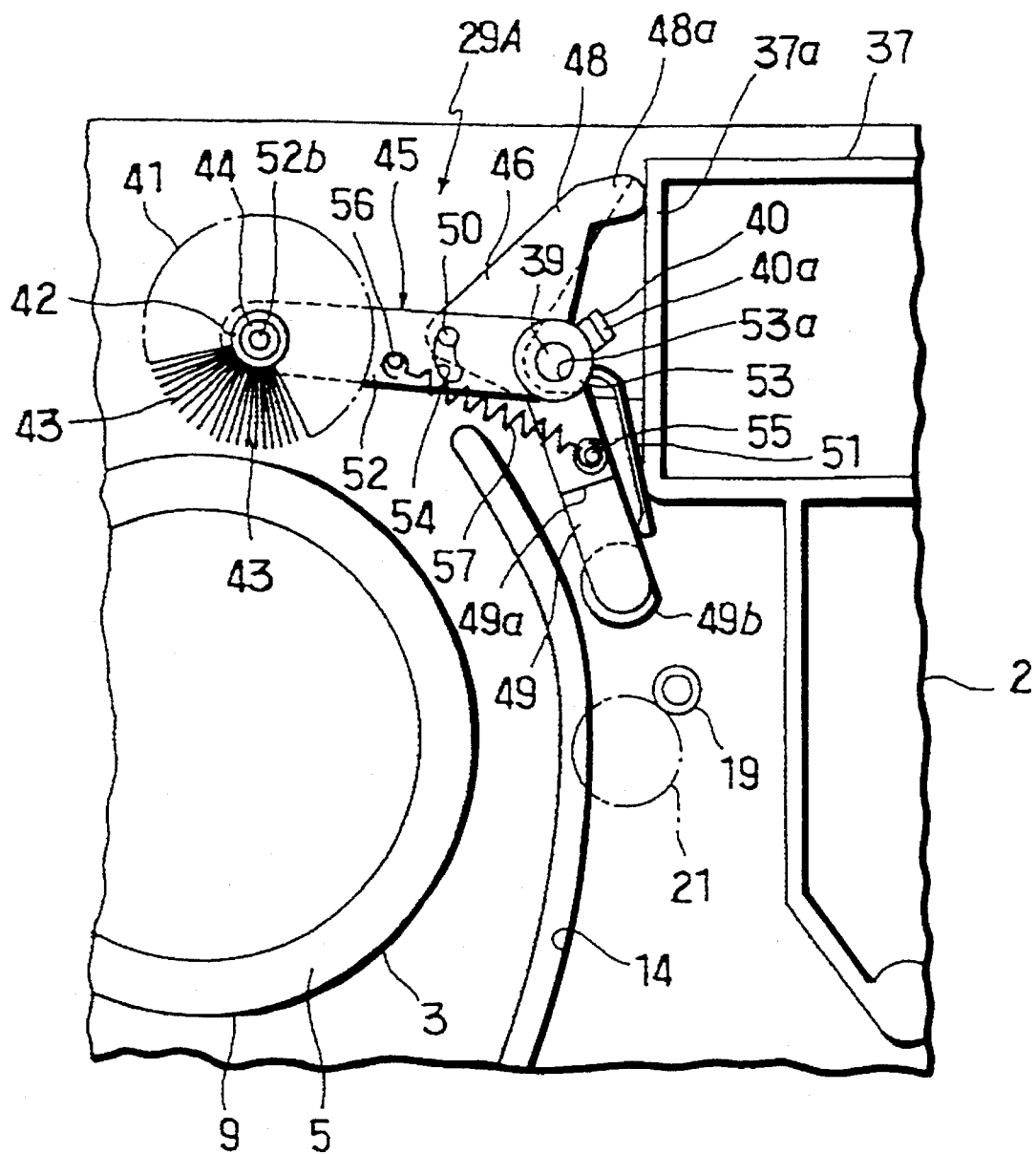
FIG. 6 is a fragmentary plan view showing a head cleaning mechanism according to a modification of the present invention.

FIGS. 6 and 7 show a head cleaning mechanism according to a modification of the present invention. The modified head cleaning mechanism, generally denoted at 29A, includes a modified swing arm assembly which is of a shape different from that of the swing arm assembly 30 shown in FIGS. 2 and 3. Other components of the head cleaning mechanism 29A are identical to those of the head cleaning mechanism 29 shown in FIGS. 2 through 5, and are denoted by identical reference numerals and will not be described in detail below.

The head cleaning mechanism 29A includes a swing arm assembly 45 comprising a base arm assembly 46 and a roller support arm 52.

The base arm assembly 46 has a vertical central cylindrical pivot 47 rotatably fitted over the vertical support shaft 39 joined to the motor bracket 37, a stopper arm 48 of an elongate triangular shape integrally formed with the vertical central cylindrical pivot 47 and extending radially outwardly therefrom, and a pressable arm 49 integrally formed with the vertical central cylindrical pivot 47 and extending radially outwardly therefrom at about 120° with respect to the stopper arm 48. The pressable arm 49 has a step 49a in its longitudinally intermediate portion and includes a downwardly displaced portion extending radially outwardly from the step 49a. A substantially semicylindrical pressable member 49b integrally projects further downwardly from the radially outer end of the downwardly displaced portion. The stopper arm 48 has a stopper abutment 48a on an end thereof and an engaging pin 50 projecting upwardly from an opposite end thereof which is positioned on the left-hand side of the cylindrical pivot 47 as viewed in FIG. 6. A resilient finger 51 projects radially outwardly from the cylindrical pivot 47 substantially parallel to the pressable arm 49.

The roller support arm 52 has a shaft support sleeve 52a that is integrally formed with and extends obliquely upwardly from an end thereof in a direction crossing the axis of the rotary head drum assembly 3. A cleaning roller support shaft 52b has its lower portion fitted in the shaft support sleeve 52a. The cleaning roller 41 is rotatably supported on the cleaning roller support shaft 52b and retained thereon by the washer 44. The other end of the roller support arm 52 has a vertical cylindrical pivot 53, similar to the cylindrical pivot 47. The roller support arm 52 also has an arcuate limit slot 54 defined in an intermediate portion thereof about the axis of the cylindrical pivot 53.

The pressable arm 49 and the roller support arm 52 have respective spring pins 55, 56 projecting upwardly therefrom.

The head cleaning mechanism shown in FIGS. 6 and 7 are assembled as follows:

First, the vertical support shaft 39 joined to the motor bracket 37 is inserted into a vertical hole 47a defined in the cylindrical pivot 47 such that the base arm assembly 46 is angularly movably supported on the chassis 2.

Then, an upper portion of the support shaft 39 which projects above the vertical hole 47a in the cylindrical pivot 47 is inserted into a vertical hole 53a defined in the cylindrical pivot 53, thus placing the roller support arm 52 on the base arm assembly 46 with the engaging pin 50 slidably inserted in the limit slot 54. Thereafter, the opposite ends of a tension coil spring 57 are hooked on the respective spring pins 55, 56.

Consequently, the roller support arm 52 is normally urged by the tension coil spring 57 to turn counterclockwise (in FIG. 6) about the cylindrical pivot 53 with respect to the pressable arm 49 for thereby displacing the cleaning roller 41 toward the rotary head drum assembly 3. However, the engaging pin 50 engages a rear end of the limit slot 54, holding the roller support arm 52 in position, as shown in FIG. 6. At this time, the resilient finger 51 is resiliently held against the side wall 37a of the bracket 37 for normally urging the swing arm assembly 45 to turn clockwise in FIG. 6 holding the stopper abutment 48a against the side wall 37a. The cleaning roller 41 is now spaced from the rotary head drum assembly 3.

When the support shaft 39 is inserted into the hole 53a in the cylindrical pivot 53, the engaging tooth 40a of the resilient engaging lever 40 resiliently snaps into locking engagement with an engaging tooth 53b on an outer circumferential surface of the cylindrical pivot 53, thereby holding the roller support arm 52 against accidental removal from the base arm assembly 46.

When the magnetic tape is loaded and unloaded, the head cleaning mechanism 29A operates in substantially the same manner as the head cleaning mechanism 29 shown in FIGS. 2 through 5.

Upon loading and unloading the magnetic tape, the cleaning roller 41 is held in a standby position spaced from the rotary head drum assembly 3 except when the movable base 16 of the right-hand tape loading block 15 moves through a certain position.

More specifically, the roller support arm 52 coupled to the base arm assembly 46 is normally urged to turn clockwise under the bias of the resilient finger 51, keeping the cleaning roller 41 spaced from head drum 3.

When the tape is loaded and unloaded, the movable base 16 of the tape loading block 15 moves along the guide groove 14, and temporarily engages and pushes the pressable member 49b of the pressable arm 49 for bringing the cleaning roller 41 into engagement with the rotary head drum assembly 3 to clean the magnetic heads 6 and surrounding areas. At this time, the roller support arm 52 operates as follows:

The roller support arm 52 is normally urged by the tension coil spring 57 to turn counterclockwise about the cylindrical pivot 53 with respect to the pressable arm 49 until the engaging pin 50 engages the rear end of the limit slot 54.

Counter forces stronger than the bias of the tension coil spring 57 may be applied to the roller support arm 52 in an initial period of engagement between the cleaning roller 41 and the rotary head drum assembly 3 because the pressable member 49b is instantaneously pushed by the movable base 16, or may also be applied by the cleaning roller 41 when it encounters convexities on the outer circumferential surface of the rotary head drum assembly 3. Under such applied counter forces, the roller support arm 52 turns clockwise about the cylindrical pivot 53 with respect to the pressable arm 49 against the bias of the tension spring 57 possibly until the engaging pin 50 engages the front end of the limit slot 54. Therefore, the spring-biased roller support arm 52 serves as a damper mechanism for holding the cleaning roller 41 against the rotary head drum assembly 3 under constant pressure.

Consequently, the flaps 43 of the cleaning roller 41 successively rub against the tape contact surfaces 6a as the flaps 43 are flexed, thus scraping dust particles such as magnetic powder particles off the tape contact surfaces 6a and regions around the tape contact surfaces 6a. Since the cleaning roller 41 is supported on the spring-biased roller support arm 52, undue shocks that are applied to the cleaning roller 41 when it impinges upon the rotary head drum assembly 3 are absorbed. The flaps 43 are thus prevented from being excessively flexed and damaged, with the result that the cleaning roller 41 has a relatively long service life.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A head cleaning mechanism for cleaning a rotary magnetic head mounted in a head drum of a helical scan recording/reproducing apparatus, in which the rotary magnetic head is movable along a circular path for recording a signal on or for reproducing a signal from a magnetic recording medium, comprising:

a mount base;

a motor bracket fixedly mounted on said mount base;

a vertical support shaft projecting from said motor bracket;

a base arm assembly rotatably mounted on said vertical support shaft including a stopper arm and a pressable arm;

a roller support arm rotatably mounted on said vertical support shaft above said base arm assembly;

a rotatable cleaning roller rotatably mounted on said roller support arm for movement into contact with said rotary magnetic head mounted in said head drum, said cleaning roller being rotatable upon contact with said rotary magnetic head;

first resilient means extending between said roller support arm and said base arm assembly for connecting said roller support arm and said base arm assembly and for biasing said roller support arm to rotate with respect to said base arm assembly in a direction to move said cleaning roller into contact with said rotary magnetic head; and second resilient means for biasing said base arm assembly so that said stopper abuts said motor bracket and said cleaning roller is out of contact with said magnetic rotary head mounted in said head drum, said cleaning roller comprising a cylindrical sleeve mounted for rotation and a plurality of flaps radially joined to said sleeve.

2. A head cleaning mechanism according to claim 1, wherein each of said plurality of flaps is coated with an abrasive material.

3. A head cleaning mechanism for cleaning a rotary magnetic head mounted in a head drum of a helical scan recording/reproducing apparatus, in which the rotary magnetic head is movable along a circular path for recording a signal on or for reproducing a signal from a magnetic recording medium, comprising:

a mount base;

a motor bracket fixedly mounted on said mount base;

a vertical support shaft projecting from said motor bracket;

a base arm assembly rotatably mounted on said vertical support shaft including a stopper arm and a pressable arm;

a roller support arm rotatably mounted on said vertical support shaft above said base arm assembly;

a rotatable cleaning roller rotatably mounted on said roller support arm for movement into contact with said rotary magnetic head mounted in said head drum, said cleaning roller being rotatable upon contact with said rotary magnetic head;

first resilient means extending between said roller support arm and said base arm assembly for connecting said roller support arm and said base arm assembly and for biasing said roller support arm to rotate with respect to said base arm assembly in a direction to move said cleaning roller into Contact with said rotary magnetic head;

second resilient means for biasing said base arm assembly so that said stopper abuts said motor bracket and said cleaning roller is out of contact with said magnetic rotary head mounted in said head drum;

a first spring pin projecting from an upper surface of said pressable arm; and a second spring pin projecting from an upper surface of said roller support arm, wherein said first resilient means comprises a spring having a first end attached to said first spring pin and a second end attached to said second spring pin and said cleaning roller comprises a cylindrical sleeve mounted for rotation and a plurality of flaps radially joined to said sleeve.

4. A head cleaning mechanism according to claim 3, wherein said roller support arm further comprises a shaft support sleeve extending obliquely therefrom, said rotatable cleaning roller being rotatably supported on said shaft support sleeve of said roller support arm.

5. A head cleaning mechanism according to claim 3, further comprising means for restricting an angular movement of said base arm assembly with respect to said roller support arm to a limited angular interval.

6. A head cleaning mechanism according to claim 5, wherein said means for restricting an angular movement comprises an engaging pin projecting upwardly from said stopper arm and an arcuate limit slot formed in said roller support arm for engagement with said engaging pin.

7. A head cleaning mechanism according to claim 3, further comprising movable means mounted on said mount base wherein said movable means engages said pressable arm for angularly moving said base arm assembly to displace said rotatable cleaning roller into contact with said rotary head against a bias of said second resilient means.

8. A head cleaning assembly for cleaning a rotary magnetic head mounted in a head drum of a helical scan recording/reproducing apparatus, in which the rotary magnetic head is movable along a circular path for recording a signal on or reproducing a signal from a magnetic recording medium comprising:

a chassis having a guide groove formed therein;

a motor bracket fixedly mounted on said chassis comprising an arm support wing and a vertical support shaft projecting upwardly from said arm support wing;

a tape loading block including a movable base movable in said guide groove;

a swing arm assembly rotatably mounted on said support shaft of said motor bracket including a pressable arm and a roller support arm formed integrally with said pressable arm and comprising a roller support end and a stopper, said swing arm assembly further comprising a cylindrical pivot fitted over said vertical support shaft for rotatably mounting said swing arm assembly on said motor bracket;

a resilient engaging lever projecting upwardly from said arm support wing of said motor bracket;

an engaging tooth projecting radially outwardly from said cylindrical pivot of said swing arm assembly for engagement with said engaging lever to snap said swing arm assembly onto said vertical support shaft to secure said swing arm assembly to said chassis;

a rotatable cleaning roller rotatably mounted on said roller support end of said roller support arm; and resilient means for biasing said swing arm assembly so that said stopper abuts said motor bracket and said cleaning roller is out of contact with said magnetic rotary head mounted in said head drum, wherein said swing arm assembly is movable so that said cleaning roller comes into contact with said magnetic rotary head when said movable base of said tape loading block engages said pressable arm, said rotatable cleaning roller comprising a cylindrical sleeve mounted for rotation and a plurality of flaps radially joined to said sleeve.

9. A head cleaning assembly according to claim 8, wherein said head drum has a recess defined in an outer circumferential surface thereof, said rotary magnetic head being disposed in said recess, and wherein said rotary magnetic head has a tape contact surface for contacting the magnetic tape, said tape contact surface projecting beyond the outer circumferential surface of said head drum in a radial direction, whereby said cleaning roller cleans said tape contact surface and a region around said rotary magnetic head within said recess.

10. A head cleaning assembly according to claim 9, wherein said head drum is rotatable in a first direction, the circular path is defined by the outer circumferential surface of said head drum, said rotary magnetic head is movable along the circular path in the first direction, and said cleaning roller is rotatable, upon contact with said rotary magnetic head, in a second direction opposite the first direction which crosses the first direction.

11. A head cleaning assembly according to claim 8, wherein each of said plurality of flaps is coated with an abrasive material.

* * * * *

UNITED STATES PATENT AND TRADEMARK OFFICE
CERTIFICATE OF CORRECTION

PATENT NO. : 5,473,493
DATED : December 5, 1995
INVENTOR(S) : Yoshio KUSUI

It is certified that error appears in the above-identified patent and that said Letters Patent is hereby corrected as shown below:

Col. 10, line 6, after "from" insert --the--

Col. 11, line 52, change "Contact" to --contact--

Signed and Sealed this

Sixth Day of May, 1997

Attest:

Attesting Officer

BRUCE LEHMAN

Commissioner of Patents and Trademarks